(12) United States Patent
Wu

(10) Patent No.: US 7,184,803 B2
(45) Date of Patent: Feb. 27, 2007

(54) APPARATUS FOR AUTOMATICALLY PROJECTING OR RETRACTING LENS IN RESPONSE TO THE DISPLAY OF AN ELECTRONIC DEVICE INCORPORATING THE APPARATUS BEING OPENED OR CLOSED

(75) Inventor: Yaz-Tzung Wu, Taipei (TW)

(73) Assignee: Inventec Corporation, Taipei (TW)

( * ) Notice: Subject to any disclaimer, the term of this patent is extended or adjusted under 35 U.S.C. 154(b) by 91 days.

(21) Appl. No.: 11/038,111

(22) Filed: Jan. 21, 2005

(65) Prior Publication Data

US 2006/0166712 A1     Jul. 27, 2006

(51) Int. Cl.
*H04M 1/00* (2006.01)

(52) U.S. Cl. .................. 455/575.1; 455/575.4

(58) Field of Classification Search ............. 455/575.1, 455/575.3, 575.4, 556.1; 348/333.06, 375
See application file for complete search history.

(56) References Cited

U.S. PATENT DOCUMENTS 6,785,935 B2 * 9/2004 Ahn et al. ................ 16/221
6,879,337 B2 * 4/2005 Tatehana et al. ......... 348/14.02
6,882,726 B2 * 4/2005 Kim ...................... 379/433.13
7,046,287 B2 * 5/2006 Nishino et al. ........ 348/333.06
2005/0186996 A1 * 8/2005 Pan ......................... 455/575.3

* cited by examiner

*Primary Examiner*—Duc M. Nguyen
*Assistant Examiner*—Chuck Huynh
(74) *Attorney, Agent, or Firm*—Bacon & Thomas, PLLC

(57) ABSTRACT

The present invention is to provide a retractable lens assembly for automatically projecting or retracting its lens in response to a display of an electronic device (e.g., cellular phone or notebook) incorporating a lens assembly being opened or closed, which includes a downwardly extended first projection at one end of a rotatable unit being fixed in a body of the electronic device, a second projection extended from an outer surface of a shaft at the other end of the rotatable unit being fixed in the display, and a lens module being rotated in one direction in response to the display being opened in a manner similar to extending the cosmetic paste of a lipstick for projecting a lens from the lens assembly for taking pictures or photographs.

5 Claims, 5 Drawing Sheets

APPARATUS FOR AUTOMATICALLY PROJECTING OR RETRACTING LENS IN RESPONSE TO THE DISPLAY OF AN ELECTRONIC DEVICE INCORPORATING THE APPARATUS BEING OPENED OR CLOSED

FIELD OF THE INVENTION

The present invention relates to lens assemblies, more particularly to an apparatus for automatically projecting or retracting its lens in response to the display of an electronic device (e.g., cellular phone or notebook) incorporating the apparatus being opened or closed for preventing the lens from being damaged in an unused state.

BACKGROUND OF THE INVENTION

The internet and wireless communications have known a rapid, spectacular development in recent years. A wide variety of wireless communication devices (e.g., GSM (Global System for Mobile Communication) cellular phones, PHS (Personal Handyphone System) cellular phones, CDMA (Code Division Multiple Access) cellular phones, notebooks, etc.) are available. These devices are inexpensive, useful, lightweight, compact, and portable. They not only bring a lot of convenience and are closely associated with our daily life and work but also meet the needs of recreation and data processing. For example, video games and many types of database software are provided. Such powerful features of the devices further increase the chance of people using them. In particular, these wireless communication devices have become a ubiquitous tool for people living and working in the bustling city life.

More and more types of cellular phone have the feature of camera as technology advances. Such camera is not for recreation purpose. In fact, it is useful and is necessary. The digital camera mounted on a cellular phone substantially has the same picture quality as a typical digital camera as a result of latest technology. For example, cellular phones having a camera of three million pixels, three times of zoom, and auto-flash are available. It is believed that cellular phones having a more advanced and compact camera can be available in a near future. This is the trend. A wide variety of cellular phones having powerful features including recreation available mean that the future of cellular phone is very bright. Currently, cellular phones having camera are very popular among consumers. This is because the camera of a cellular phone has incorporated many useful features of a digital camera.

In another aspect, more and more types of notebook have the feature of camera as advanced technology employed in recent years. Also, such notebooks are very popular. It is certain that both cellular phones and notebooks having camera feature have a bright future. Also, they are inexpensive. Thus, more and more people would like to buy a cellular phone with camera and a notebook with camera if such needs arise. This means that their qualities are acceptable by the mass consumers. In addition, multifunctional products are available due to new advances in technology and they are gaining popularity among consumers gradually. Both cellular phones with camera and notebooks with camera are ones of such products because they bring a lot of convenience to users.

However, practicability of such product is also constantly concerned by consumers in spite of their advanced, multifunctional features. It is known that the lens of a cellular phone with camera or the lens of a notebook with camera is typically projected from the body. For example, the lens is pivotably provided in the edge of an LCD (liquid crystal display) of a notebook. Also, the lens is pivotably provided in a hinge interconnected an LCD of a cellular phone and its body. Such projected lens is subject to damage due to collision or scraping, resulting in a great financial loss of the user.

Consequently, practicability of such products having camera produced by the manufacturers is concerned by consumers. Thus, whether cellular phones or notebooks having camera produced by an electronic company in the future can defeat other competitive ones is decided by whether it can overcome the above inadequacy by providing a more ergonomic, user friendly cellular phone or cellular phone having the camera feature.

SUMMARY OF THE INVENTION

After considerable research and experimentation, an apparatus for automatically projecting or retracting lens in response to the display of an electronic device (e.g., popular cellular phone or notebook with camera feature) incorporating the apparatus being opened or closed according to the present invention has been devised so as to overcome the above drawback (e.g., the projected lens of the cellular phone or notebook being subject to damage due to collision or scraping, resulting in a great financial loss of the user) of the prior art.

It is an object of the present invention to provide a retractable lens assembly for automatically projecting or retracting its lens in response to the display of an electronic device (e.g., cellular phone or notebook) incorporating the lens assembly being opened or closed so as to overcome the above drawback (e.g., the projected lens of the cellular phone or notebook being subject to damage due to collision or scraping, resulting in a great financial loss of the user) of the prior art. By utilizing the retractable lens assembly, a couple of advantages can be obtained.

(i) A downwardly extended first projection at one end of a rotatable unit is fixed in a body of the electronic device. A second projection extended from an outer surface of a shaft at the other end of the rotatable unit is fixed in the display of the electronic device. A lens module may rotate in one direction in response to the display being opened in a manner similar to extending the cosmetic paste of a lipstick for projecting a lens from the lens assembly and thus enabling a user to take pictures or photographs.

(ii) After taking pictures or photographs or the lens is not used any more, the user may close the display onto the body of the electronic device for retracting the lens module into the lens assembly so as to prevent the lens module from being damaged by collision or scraping.

The above and other objects, features and advantages of the present invention will become apparent from the following detailed description taken with the accompanying drawings.

DETAILED DESCRIPTION OF THE PREFERRED EMBODIMENTS

Figure 1:
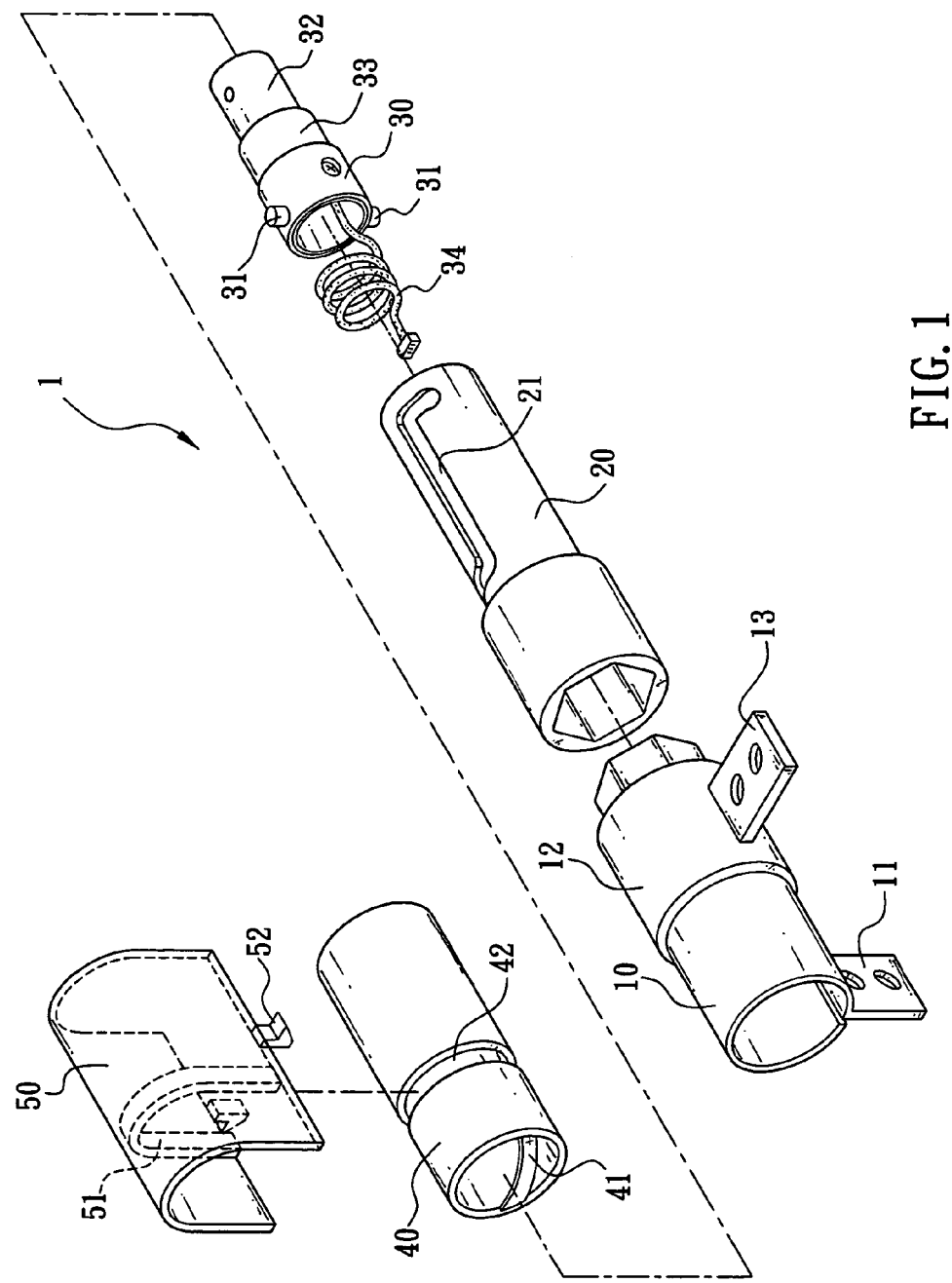
FIG. 1 is an exploded view of a preferred embodiment of retractable lens assembly according to the invention.
Figure 2:
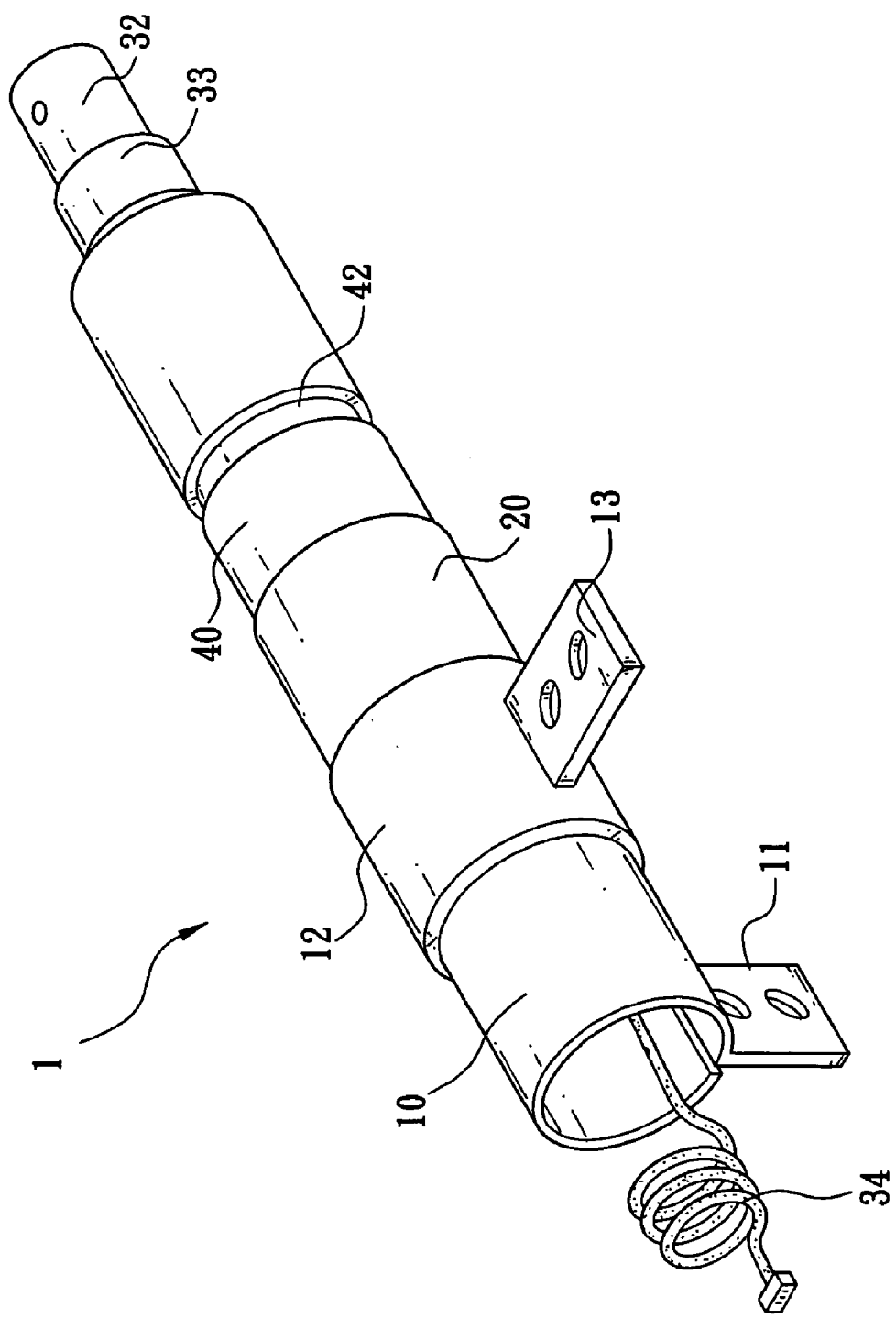
FIG. 2 is a perspective view of the assembled lens assembly.

Referring to FIGS. 1 and 2, there is shown a retractable lens assembly 1 mountable in a hinge of an electronic device according to the invention. The lens assembly 1 comprises a hollow, cylindrical rotatable unit 10, a hollow shaft unit 20, a cylindrical lens module 30, and a sleeve 40. Each component is discussed in detailed below.

The rotatable unit 10 comprises a first projection 11 extended downwardly from one end, a rotatable shaft 12 at the other end, and a second projection 13 extended from an outer surface of the shaft 12. Both the shaft 12 and the second projection 13 are adapted to rotate about the rotatable unit 10.

In the invention the shaft unit 20 has its one end fixedly put on a mated extension at the other end of the rotatable unit 10 and comprises two opposite L-shaped channels 21 on its surface. Thus, the shaft unit 20 is adapted to rotate the same in response to rotating the shaft 12 and the second projection 13.

In the invention the lens module 30 is adapted to take pictures or photographs and comprises two opposite tabs 31 on its outer surface at one end, the tabs 31 adapted to dispose in the channels 21 and project therefrom for coupling the lens module 30 to the other end of the shaft unit 20, a lens 32 formed at the other end, and an intermediate rotating member 33 between the lens 32 and the tabs 31, the rotating member 33 adapted to rotate the lens 32 a predetermined angle for focusing an object, and a cable 34 extended from inside of the lens module 30 into the shaft unit 20 and through the rotatable unit 10 (i.e., projected from one end of the rotatable unit 10). In the embodiment of the invention the cable 34 is a coil-shaped one such that a sufficient length can be provided by the cable 34 for permitting a projecting or retracting operation of the lens module 30.

In the invention the sleeve 40 has an elongated bore and comprises a double spiral groove 41 on its inner surface, the double spiral groove 41 adapted to enable the sleeve 40 to put on the shaft unit 20 with the tabs 31 slidable along and defined by the double spiral groove 41 when the lens module 30 is rotating. The sleeve 40 further comprises an annular trough 42 on its outer surface.

In the invention there is further provided a cover 50 of inverted-U section on the lens assembly 1. The cover 50 comprises an inverted-U shaped rib 51 on its inner surface, and two opposite latches 52 extended downwardly from both bottom sides. The rib 51 is fitted in the trough 42 when the cover 50 is put on the sleeve 40. Also, press down on the latches 52 to snap them into a hinge of an electronic device. As a result, the sleeve 40 is covered and fastened.

Figure 3:
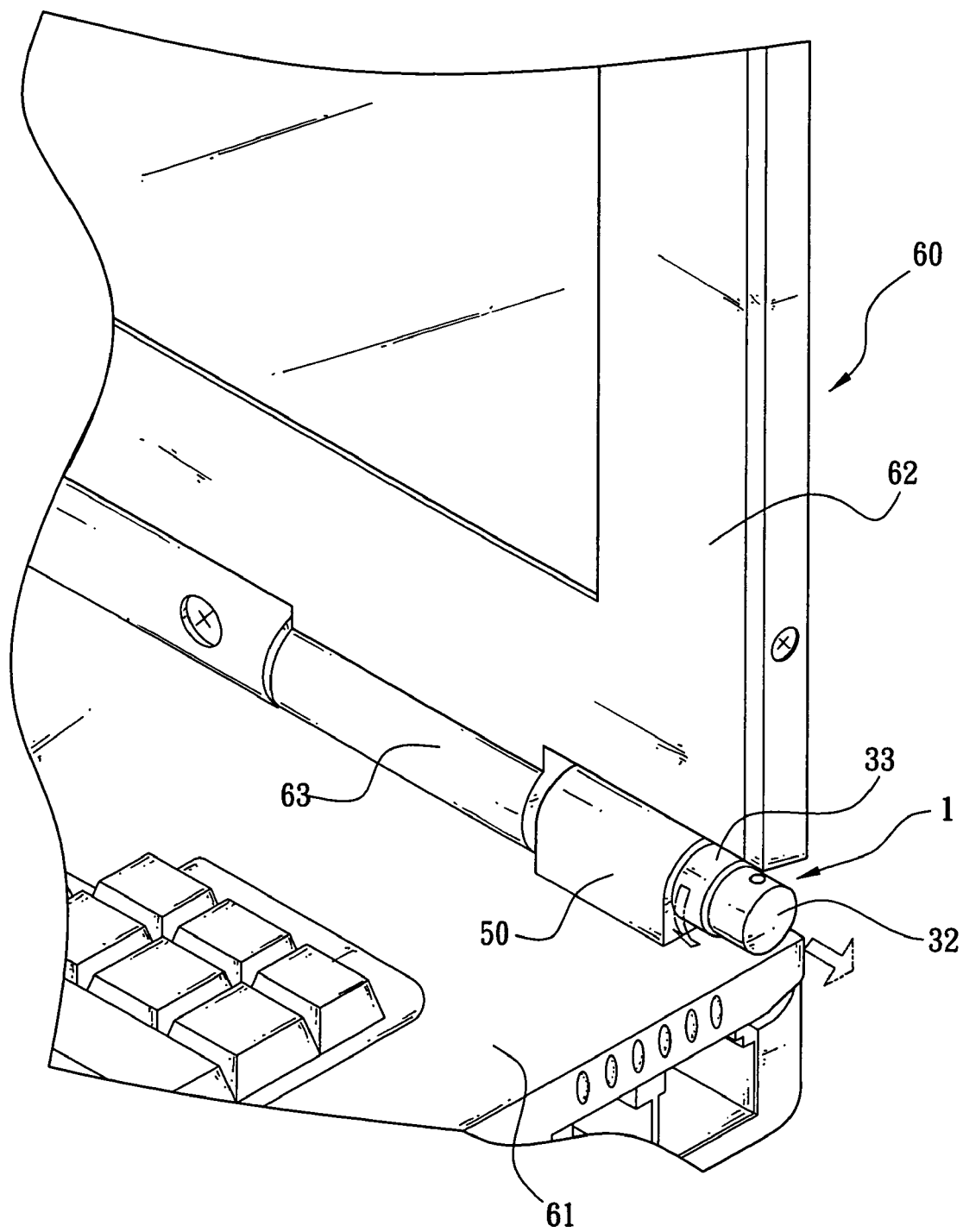
FIG. 3 is a perspective view of a portion of a notebook incorporating the lens assembly according to a preferred embodiment of the invention, where the display is open with the lens projected.

Referring to FIG. 3 in conjunction with FIG. 2, a preferred embodiment of the invention is shown. The lens assembly 1 is mounted in an electronic device (e.g., notebook 60 as shown). The notebook 60 comprises a flat body 61 and an LCD 62. The body 61 and the LCD 62 are connected together by means of at least one hinge 63. The lens assembly 1 is mounted at one end of the hinge 63. In detail, the downwardly extended first projection 11 at one end of the rotatable unit 10 is fixed in the body 61. The second projection 13 extended from the outer surface of the shaft 12 is also fixed in the LCD 62. One end of the cable 34 is extended to electrically connect to circuitry of a motherboard (not shown) in the body 61. Finally, the latches 52 are pressed down to snap into a fixed hinge pin (not shown) of the hinge 63.

By configuring as above, both the shaft 12 and the shaft unit 20 rotate in response to the LCD 62 being opened. Also, the sleeve 40 is not able to rotate because it is secured to the cover 50. Hence, the tabs 31 of the lens module 30 slide along the double spiral groove 41 and move up. And in turn, the lens module 30 extends outwardly in a manner similar to extending the cosmetic paste of a lipstick. As a result, a user may operate the extended lens 32 to take pictures or photographs. Moreover, the user may rotate the rotating member 33 an angle until an object is focused even if the angle of the LCD 62 with respect to the body 61 is not fixed. The user may close the LCD 62 onto the body 61 when the lens module 30 is not used any more. The lens module 30 thus moves down along the double spiral groove 41 to retract into the lens assembly 1 in a manner similar to retracting the cosmetic paste of the lipstick.

Figure 4:
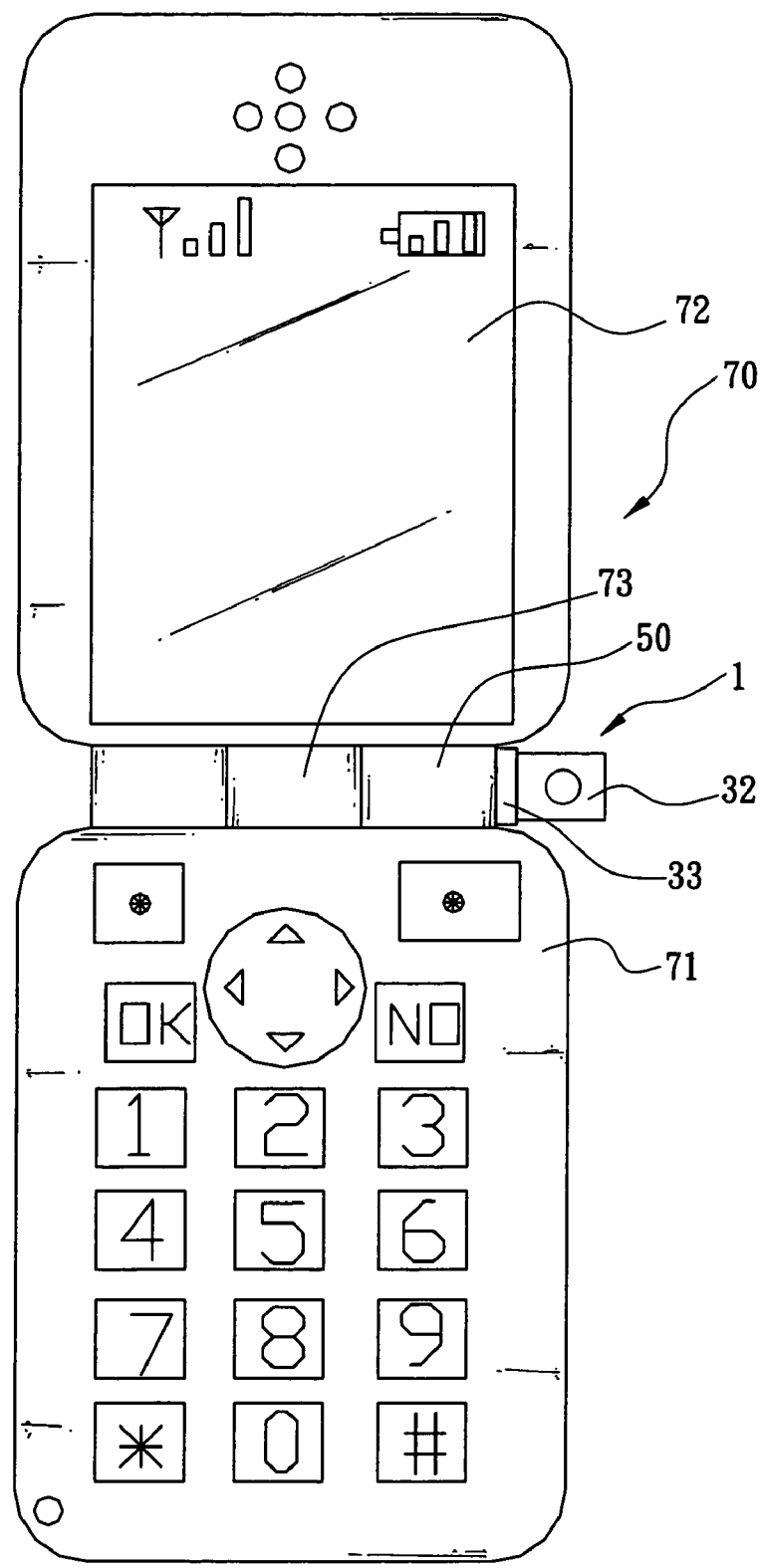
FIG. 4 is a top view of a cellular phone incorporating the lens assembly according to another preferred embodiment of the invention, where the display is open with the lens projected.

Referring to FIG. 4 in conjunction with FIG. 2, another preferred embodiment of the invention is shown. The lens assembly 1 is mounted in another electronic device (e.g., cellular phone 70 as shown). The cellular phone 70 comprises a flat body 71 and an LCD 72. The body 71 and the LCD 72 are connected together by means of at least one hinge 73. The lens assembly 1 is mounted at one end of the hinge 73. In detail, the downwardly extended first projection 11 at one end of the rotatable unit 10 is fixed in the body 71. The second projection 13 extended from the outer surface of the shaft 12 is also fixed in the LCD 72. One end of the cable 34 is extended to electrically connect to circuitry of a motherboard (not shown) in the body 71. Finally, the latches 52 are pressed down to snap into a fixed hinge pin (not shown) of the hinge 73.

Figure 5:
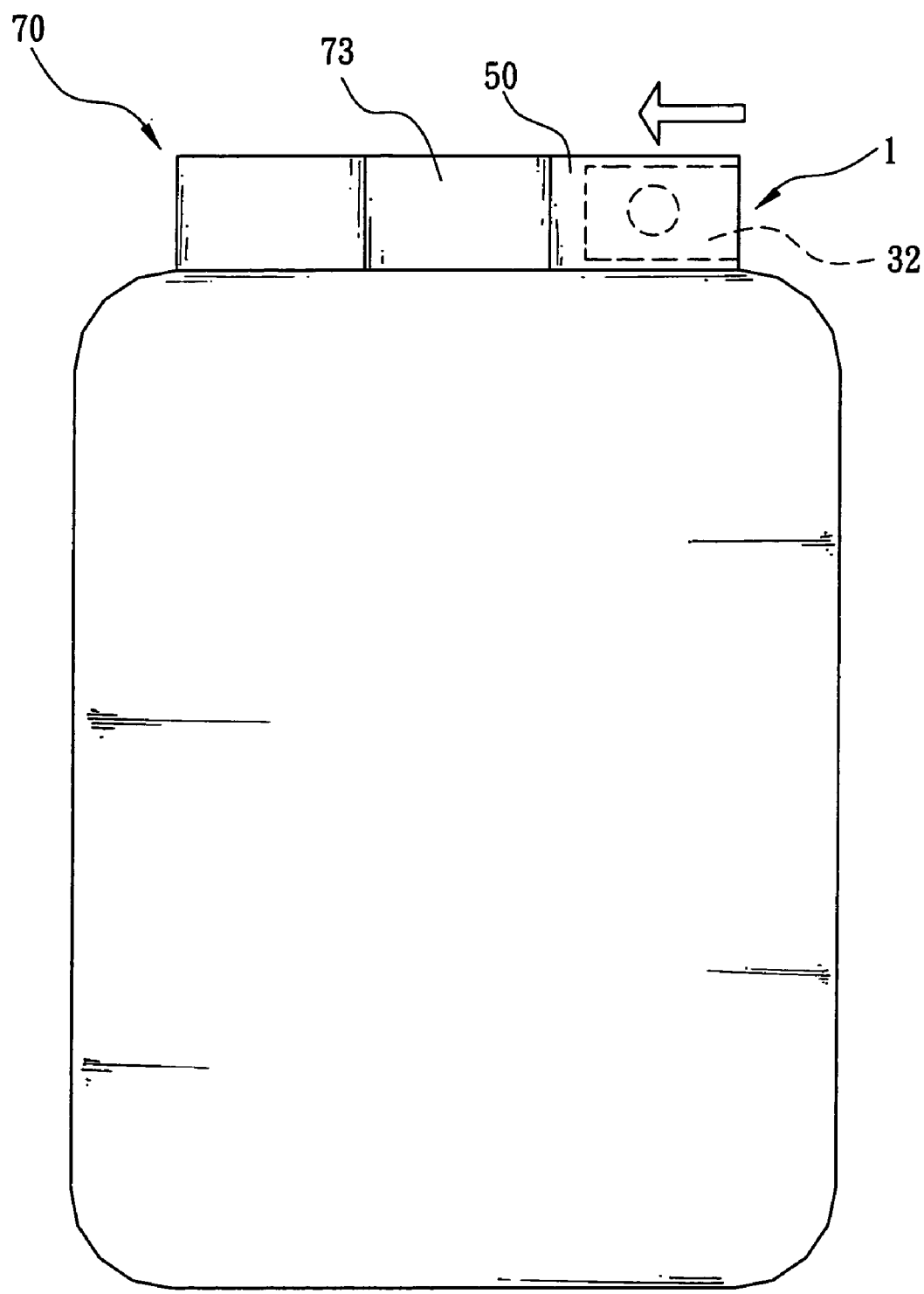
FIG. 5 is a top view of the cellular phone where the display is closed with the lens retracted.

By configuring as above, the lens module 30 may project or retract in response to the LCD 72 being opened or closed in a manner similar to extending or retracting the cosmetic paste of a lipstick as described above. Accordingly, further description is omitted for purpose of brevity. Referring to FIG. 5, it shows the retracted lens module 30 when the user closes the LCD 72 onto the body of the cellular phone 70.

In view of the above, the retractable lens assembly 1 of the invention is adapted to mount in a notebook 60, a cellular phone 70, a PDA (personal digital assistant), or any of other suitable electronic devices. Most importantly, the lens module 30 is adapted to retract into the lens assembly 1 when the lens module 30 is not used any more so as to prevent the lens module 30 from being damaged by collision or scraping. Otherwise, a great financial loss may be borne upon a user.

While the invention herein disclosed has been described by means of specific embodiments, numerous modifications and variations could be made thereto by those skilled in the art without departing from the scope and spirit of the invention set forth in the claims.

What is claimed is:

1. An apparatus mountable on an electronic device, comprising:

hollow, cylindrical rotatable means comprising a first projection extended downwardly from one end of the rotatable means to fix the hollow, cylindrical rotatable means in a body of the electronic device, a rotatable shaft formed at the other end of the hollow, cylindrical rotatable means, and a second projection extended from an outer surface of the shaft to fix the rotatable shaft in a display of the electronic device, wherein the shaft and the second projection are adapted to rotate about the rotatable means when the display of the electronic device is pivoted relative to the body of the electronic device;

hollow shaft means having one end fixedly put on a mated member at the other end of the rotatable means and comprising two opposite channels formed on its surface, wherein the hollow shaft means is adapted to rotate in response to rotating the shaft and the second projection;

a cylindrical lens module for taking pictures or photographs and comprising two opposite tabs formed on its outer surface at one end of the cylindrical lens module, the tabs adapted to be disposed in the channels and project therefrom for coupling the lens module to the shaft means, a lens formed at the other end of the cylindrical lens module, and a cable extended from inside of the lens module into the shaft means and through the rotatable means to project from one end of the rotatable means;

a sleeve comprising a double spiral groove on its inner surface, the double spiral groove adapted to receive said tabs projecting from said channels when the sleeve is positioned over the shaft means, with the tabs slidable in said channels and along the double spiral groove to cause said lens module to project from and retract into said shaft means when the lens module is rotating relative to said sleeve; and a cover put on the lens assembly and comprising two opposite latches extended downwardly from bottom sides such that pressing down on the latches snaps them into a hinge of the electronic device to fasten the sleeve to the hinge of the electronic device, wherein the lens is adapted to project from or retract into the lens module in response to the display of the electronic device being opened or closed.

2. The apparatus of claim 1, further comprising a rotating member formed between the lens and the tabs, the rotating member adapted to rotate the lens a predetermined angle for focusing an object.

3. The apparatus of claim 1, wherein the cable is a coil-shaped one such that the cable is able to provide a sufficient length for permitting the lens module to project or retract.

4. The apparatus of claim 1, wherein one end of the cable is extended to electrically connect to a motherboard in the body of the electronic device.

5. The apparatus of claim 1, wherein the sleeve further comprises an annular trough formed on its outer surface, and the cover further comprises a rib formed on its inner surface, the rib adapted to fit in the trough for fastening the sleeve.

* * * * *